(12) United States Patent
Stadtfeld

(10) Patent No.: US 6,311,590 B1
(45) Date of Patent: Nov. 6, 2001

(54) CUTTING TOOL FOR PRODUCING GEARS BY FACE HOBBING

(75) Inventor: Hermann J. Stadtfeld, Rochester, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/565,925

(22) Filed: May 5, 2000

Related U.S. Application Data (60) Provisional application No. 60/132,709, filed on May 5, 1999.

(51) Int. Cl.$^7$ ................. B23B 1/00; B23C 5/20
(52) U.S. Cl. ................. 82/1.11; 82/47; 407/20; 407/22
(58) Field of Search ................. 82/1.11, 46, 47; 407/20, 21, 22, 23, 30

(56) References Cited

U.S. PATENT DOCUMENTS

| | | |
|---|---|---|
| 2,975,508 | 3/1961 | Picanol . |
| 3,760,476 | 9/1973 | Kotthaus . |
| 4,060,881 * | 12/1977 | Ryan et al. .............. 407/22 |
| 4,197,038 * | 4/1980 | Hipp et al. .............. 407/22 |
| 4,525,108 | 6/1985 | Krenzer . |
| 4,575,285 | 3/1986 | Blakesley . |
| 4,575,286 * | 3/1986 | Blakesley .............. 407/22 |
| 4,621,954 | 11/1986 | Kitchen et al. . |
| 4,864,896 * | 9/1989 | Pfaltzgraff .............. 76/25.1 |
| 5,934,841 * | 8/1999 | Rutschke et al. .............. 407/22 |

OTHER PUBLICATIONS

Kotthaus, Eric, "Wirtschaftliches Herstellen von Spiralkegelrädern in kleinen und großen Serien" Maschinenmarkt, vol. 83, No. 73, Sep. 13, 1977, Würzburg.

* cited by examiner

Primary Examiner—Henry Tsai
(74) Attorney, Agent, or Firm—Robert L. McDowell (57) ABSTRACT

Cutting blade and system that allows all the freedoms of the three-side-ground cutting blade while using a two-side-ground cutting blade. A new cutting edge can be defined on the two-side-ground cutting blade that will duplicate the tooth surface cut by the three-side-ground cutting blade with different hook and side rake angles. The new cutting edge of the two-side-ground cutting blade is determined by a plurality of points, each point corresponding to a point on the three-side-ground cutting blade, such that when cutting, each point along the cutting edge of a two-side ground cutting blade will lie on the same epicycloid generated by the corresponding points on a three-side-ground cutting blade with different hook and side rake angles.

5 Claims, 8 Drawing Sheets

CUTTING TOOL FOR PRODUCING GEARS BY FACE HOBBING

This application claims the benefit of U.S. Provisional Application No. 60/132,709 filed May 5, 1999.

FIELD OF THE INVENTION

The present invention is directed to cutting tools for producing toothed articles. In particular, the present invention discloses a cutting tool for producing gears by face hobbing methods.

BACKGROUND OF THE INVENTION

In the manufacture of bevel and hypoid gears with curved flank lines, the cutting tools utilized are primarily face mill or face hob cutters, such types of cutting tools are well known in the art of gear manufacture. In face mill cutters the cutting blades are arranged in the cutter head such that one tooth slot is formed with each plunge of the cutter and the cutter must be withdrawn and the workpiece indexed to the next tooth slot position in order to form the next tooth slot.

Face hobbing comprises cutting blades arranged about a cutter, not in line with each other, but in groups, with usually two or three cutting blades per group. In two-blade groups, such as disclosed by U.S. Pat. No. 4,575,285 to Blakesley; U.S. Pat. No. 4,621,954 to Kitchen et al. and U.S. Pat. No. 4,525,108 to Krenzer, the blade pair comprises an inner cutting blade and an outer cutting blade. In the three-blade group, such as disclosed by U.S. Pat. No. 3,760,476 to Kotthaus, a "bottom" cutting blade is included along with an inside and outside cutting blade.

Unlike most face milling processes, in which all cutting blades pass through the tooth slot during its formation, face hobbing comprises each successive group of cutting blades passing through respective successive tooth slot with each blade in the group forming a cut completely along the longitudinal portion of the tooth slot. The cutter and the workpiece rotate in a timed relationship with each other thereby allowing continual indexing of the workpiece and continual formation of each tooth slot of the gear. If the hobbing process is of the generating type, the appropriate generating motions are superimposed with the timed relationship rotations of the tool and workpiece. Thus, in face hobbing, a single plunge of the cutting tool results in all tooth slots of the workpiece being formed.

Cutting tools for face hobbing processes usually consist of disk-shaped cutter heads with stick-type cutting blades, made from bar stock high speed steel (HSS) or carbide for example, which are inserted and positioned in slots formed in the cutter heads. Each cutting blade comprises a face portion oriented at a predetermined angle known as a side rake angle, cutting edge, a cutting side surface oriented at a predetermined relief angle, clearance edge, clearance side surface oriented at a predetermined relief angle, and a top surface.

In one type of cutting blade, such as that shown in previously disclosed U.S. Pat. No. 3,760,476, the cutting edge is inclined with respect to a plane containing the cutter axis (axial plane) that is oriented rotationally to contact the cutting edge, the angle of inclination being known as the effective hook angle. The effective hook angle (regardless of the number of blades per group) is comprised of two elements, the built-in hook angle and the cutting blade hook angle. The built-in hook angle is the angle of a blade mounting slot machined into a cutter head. This is the angular orientation of the cutting blade body when mounted in the cutter head and is usually in the range of about 4° to 12°. The other hook angle is the actual front face angular orientation on the cutting blade. In face hobbing, the effective hook angle, which is the angle resulting from the built-in hook angle and the actual cutting blade front face hook angle, is preferably zero degrees (0°). The skilled artisan will also understand that in cutting blades having a side rake angle, the pressure angle of the cutting edge, or any change thereof, will also have influence the effective hook angle.

In one type of cutting tools (for example U.S. Pat. No. 3,760,476 discussed above) the cutting blades are sharpened by grinding the cutting side surface, the clearance side relief surface and the front face. These cutting blades will hereafter be referred to as "three-side-ground" cutting blades. By grinding the front face, adjustments to the side rake angle and the hook angle may be effected. Such changes may be utilized to keep the effective hook angle at 0° or to influence tooth surface geometry. However, by grinding the front face, any coatings located on the front face are destroyed.

In another type of cutting blade, usually found in the two-blade per group cutting tool comprising an inside cutting blade and an outside cutting blade (previously discussed U.S. Pat. No. 4,575,285 for example), the cutting blades are sharpened by removing stock material from the cutting side and clearance side surfaces only (hereafter "two-side-ground" cutting blades). Thus, the front face and any coating materials (e.g. TiN, TiAlN) located on the front face are preserved during sharpening. However, in the two-side ground blade, the front face is not ground during sharpening and, therefore, there is no control of effective hook angle and less flexibility to control tooth surface geometry since the side rake angle and hook angle adjustments, obtained by grinding the front face, are not available.

It can be seen, therefore, that in three-side-ground cutting blades, any hook angle brought about by formation of the particular pressure angle and side rake angle can be adjusted by grinding the front face to form a 0° effective hook angle. However, in cutting blades such as those of U.S. Pat. No. 4,575,285 for example, any effective hook angle must remain on the cutting blade. As an example, with a pressure angle range of 16°–24° and a side rake angle of 10°–20°, an effective hook angle of about +/−4° is formed on the above cutting blade. The +/− indicating the hook angle is positive on one of the inside or outside cutting blade and negative on the other inside or outside cutting blade.

Thus, it can be seen that one member of a gear pair cut with a three-side-ground type of cutting cannot be meshed with the other member of the gear pair cut with a two-side-ground type of cutting blade. The mating members will not mesh properly due to the flank twist, profile crowning and spiral angle differences introduced in the member cut with the two-side-ground cutting tool and having an effective hook angle of, for example, +/−4°.

It is an object of the present invention to provide two-side-ground cutting blades for cutting toothed articles heretofore cut by three-side-ground cutting blades.

It is a further object of the present invention to provide two-side-ground cutting blades whereby an effective hook angle modification is introduced such that toothed articles cut by the two-side-ground cutting blades are essentially identical to those articles heretofore cut by the three-side-ground cutting blades.

It is a further object of the present invention to provide a cutting tool comprising the above two-side-ground cutting blades.

SUMMARY OF THE INVENTION

The present invention provides a two-side-ground cutting blade that allows all the freedoms of the three-side-ground cutting blade. A new cutting edge can be defined on the two-side-ground cutting blade that will duplicate the tooth surface cut by the three-side-ground cutting blade with different hook and side rake angles. The new cutting edge of the two-side-ground cutting blade is determined by a plurality of points, each point corresponding to a point on the three-side-ground cutting blade, such that when cutting, each point along the cutting edge of a two-side ground cutting blade will lie on the same epicycloid generated by the corresponding points on a three-side-ground cutting blade with different hook and side rake angles.

DETAILED DESCRIPTION OF THE PREFERRED EMBODIMENT

The present invention will now be discussed with reference to the accompanying drawings.

It is known from previously discussed U.S. Pat. No. 4,525,108 that in producing a cutting tool for face hobbing of bevel gears, placement of the blade mounting slots, and hence the cutting blades themselves, should be selected at a location midway between the extreme blade positions necessary to cut a corresponding range of gear sizes. Thus, a single cutting tool is capable of cutting a range of job sizes. Variations in the gear sizes and tooth surface geometries are then accounted for by selecting cutting blades having the appropriate parameters (pressure angle, side rake angle, etc.) for the particular job.

In producing a cutting tool having two-side-ground cutting blades that duplicate those gears cut by a tool having three-side-ground cutting blades, certain basic parameters must remain unchanged from one tool to the other. These parameters include slot radius, number of blade groups, blade spacing and cutter height.

Figure 1:
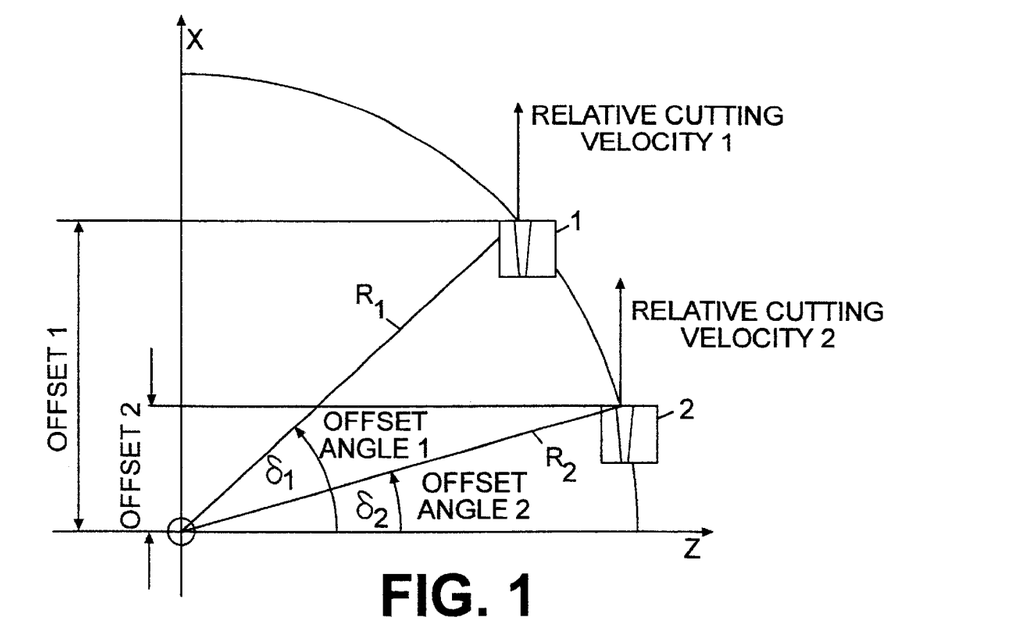
FIG. 1 diagrammatically illustrates basic parameters of a gear cutting tool.
Figure 2:
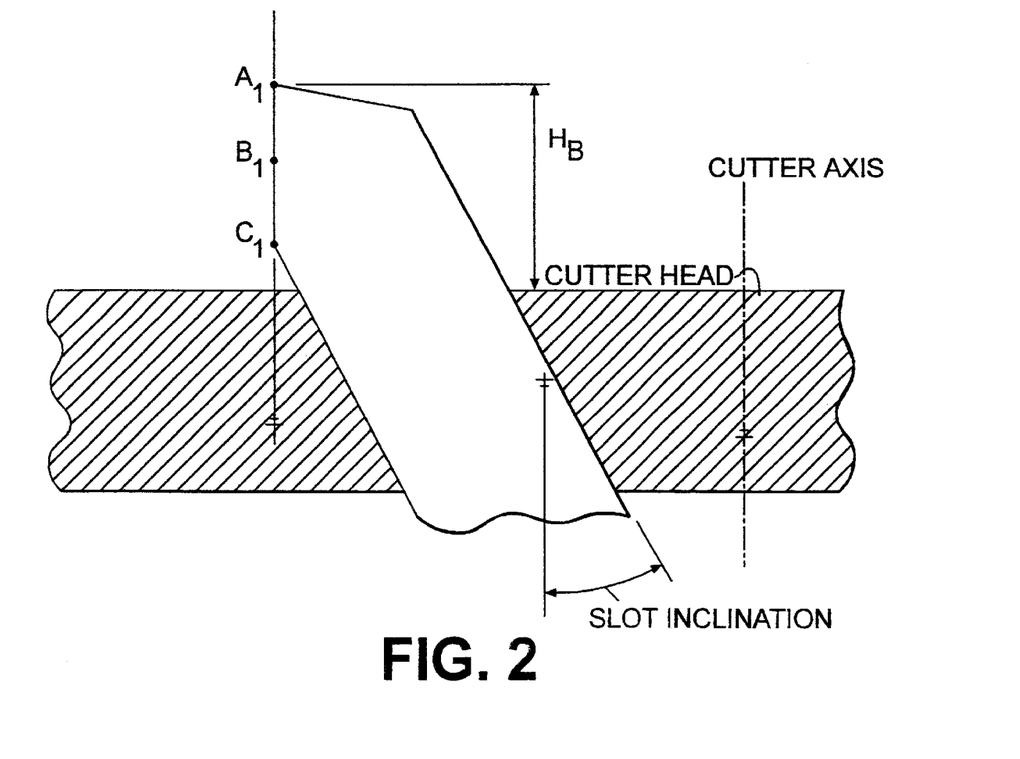
FIG. 2 is an enlarged view of a cutting blade positioned in a cutter head having zero effective hook angle.
Figure 3:
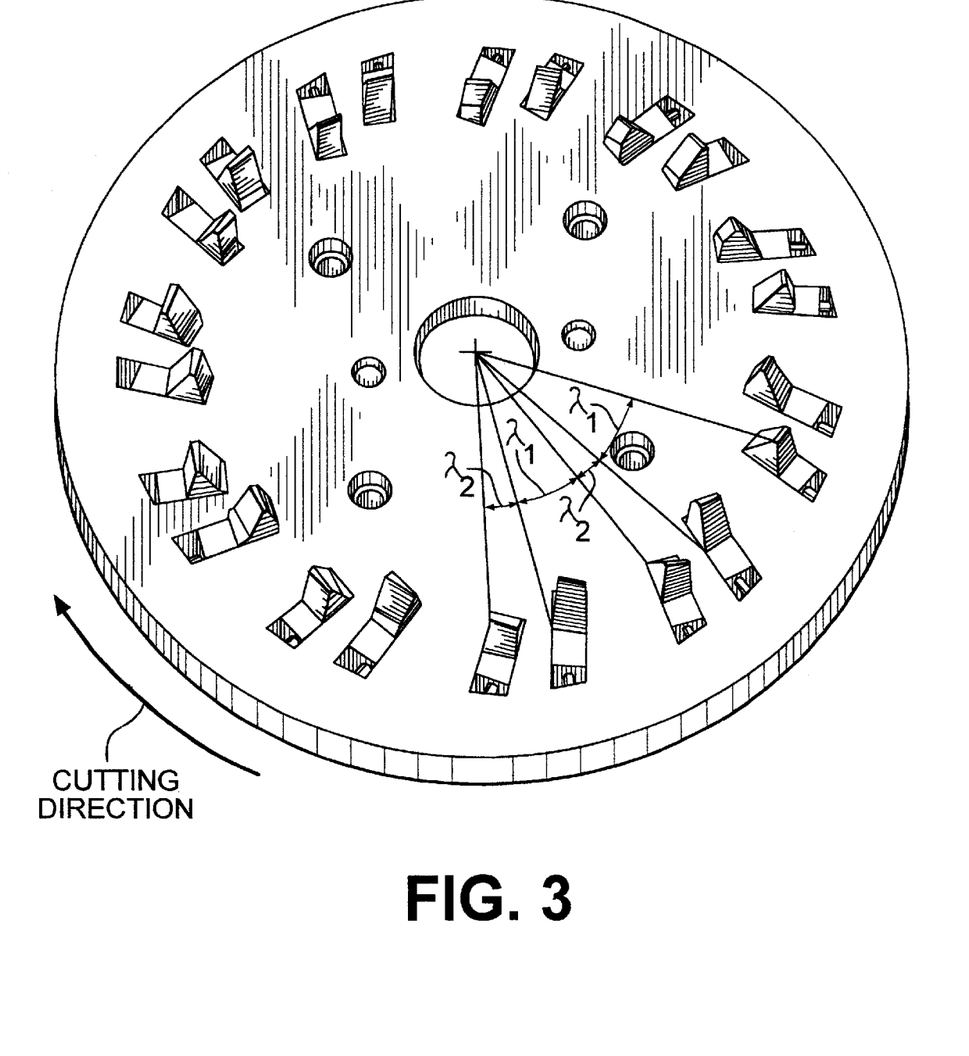
FIG. 3 is a top view of the inventive cutting tool for face hobbing comprising groups of two-side-ground cutting blades.

FIGS. 1, 2 and 3 illustrate the above parameters. For illustrative purposes, FIG. 1 shows two cutting blades 1, 2 (each having no side rake angle) positioned in mounting slots of a cutter head at respective radii $R_1=R_2$ from the center of the cutter head. The offset angles $\delta_1$ and $\delta_2$ indicate that because of different relative velocity directions, one and the same cutter head should cover different effective offsets but having physically only one fixed built-in offset. The relative cutting velocity of each blade is perpendicular to the front face of the cutting blade. FIG. 2 illustrates the slot inclination in the cutter head as well as the blade height $H_B$. Of course, the number of blade groups on the cutter head is dependent upon the particular gear being cut as is known by the skilled artisan.

FIG. 3 illustrates cutter blade spacing on the inventive cutting tool. The angle of an inside cutting blade behind an outside cutting blade is shown as $\lambda_1$ and the angle of an outside cutting blade behind an inside cutting blade is shown as $\lambda_2$. All blades of the cutter head are spaced according to these angles and the following applies:

$\lambda_1+\lambda_2=360°$/number of starts on cutter

Figure 4:
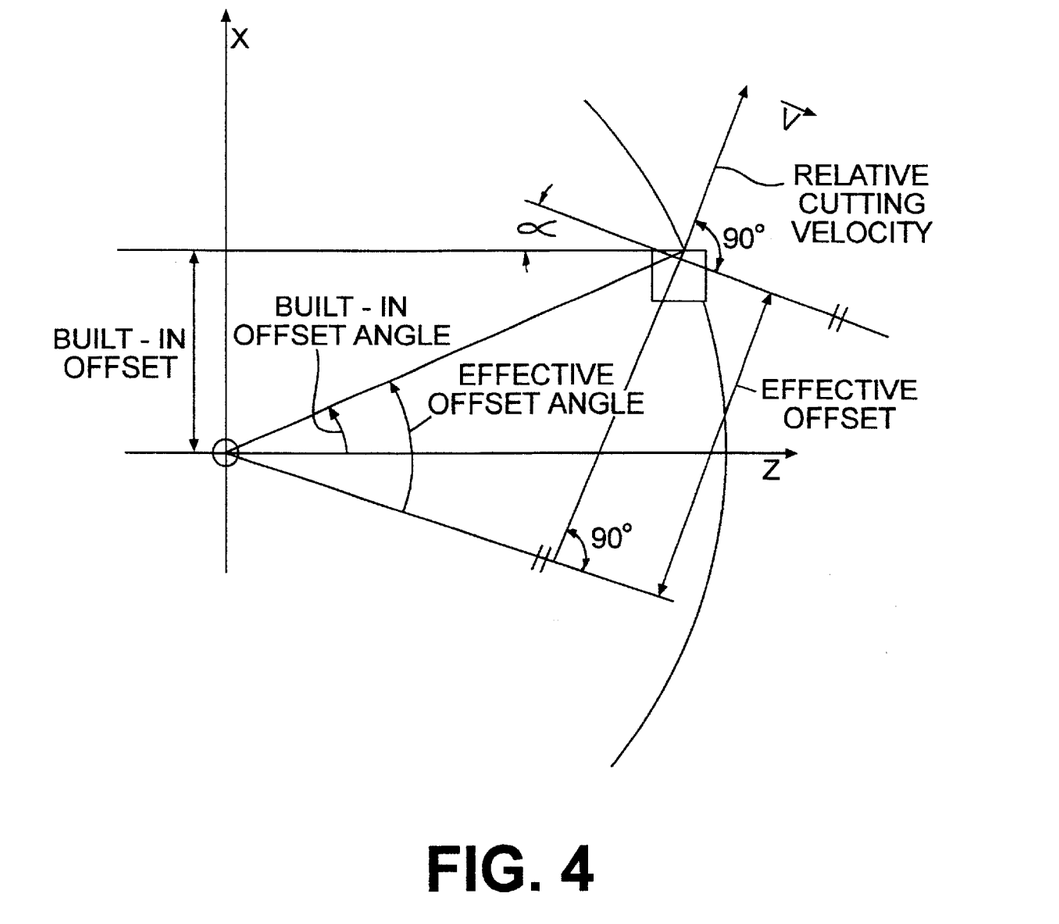
FIG. 4 illustrates the effects on cutting tool parameters brought about by the formation of a side rake angle.
Figure 5:
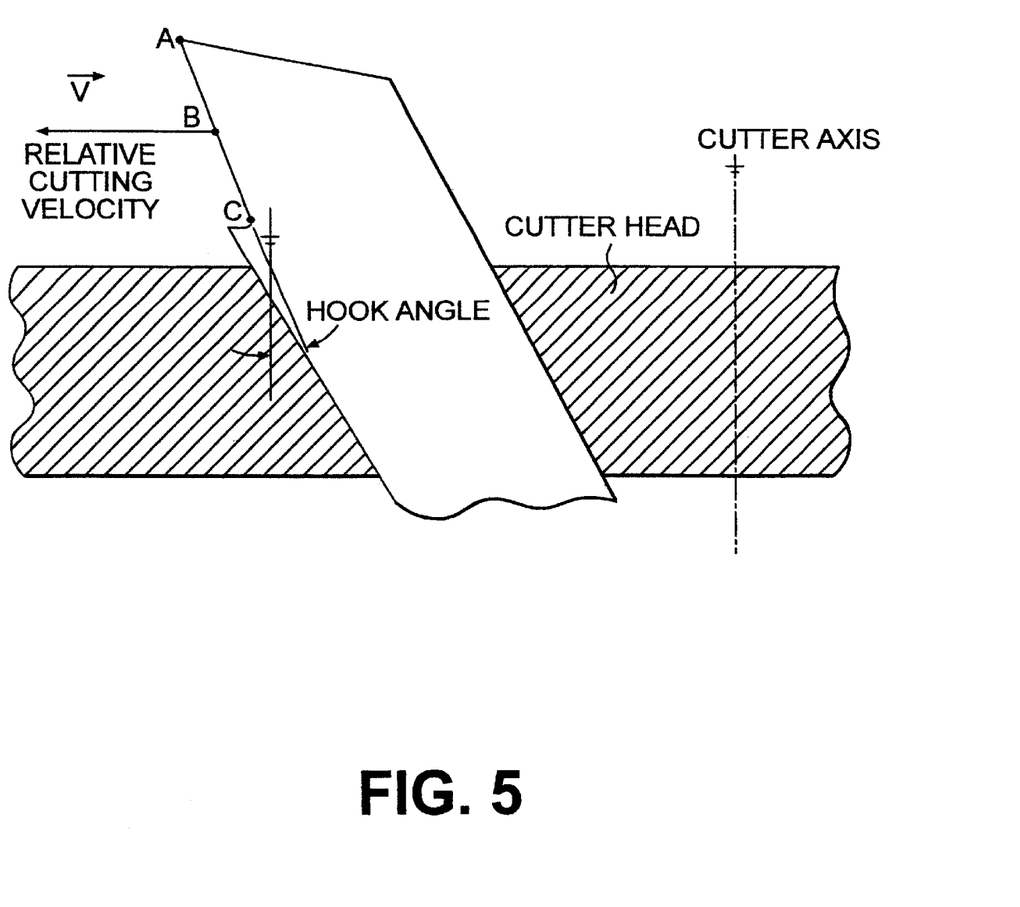
FIG. 5 shows the formation of an effective hook angle on the cutting blade of FIG. 2.

FIG. 4 illustrates how a cutting blade that is located in the cutter built-in offset position can simulate a different offset angle (or relative offset) by changing the front face orientation ($\alpha$). Compare to FIG. 1 where two different offsets are realized with two different built-in offsets. The relative cutting velocity dictates the required effective blade offset. FIG. 5 shows an effective hook angle formed on the cutting blade of FIG. 2 (which has a zero effective hook angle), the relative cutting velocity vector of FIG. 5 being in the presentation plane.

By removing controlled amounts of stock material from the front face of the three-side-ground cutting blade, the side rake angle can be adjusted to vary the cutting direction while the effective hook angle can be adjusted to cause the twisting of the tooth flank surface along the tooth length, a change in profile crowning and a change in pressure angle. These changes can be introduced with no change to the cutter head itself. Hence, the three-side-ground cutting blade allows a change in the effective hook angle and this freedom is used for flank form and contact movement (adjustability) optimizations. These are blade control parameters that are not available of the two-side-ground blade where the front face is preserved and only the side surfaces are ground.

Figure 6:
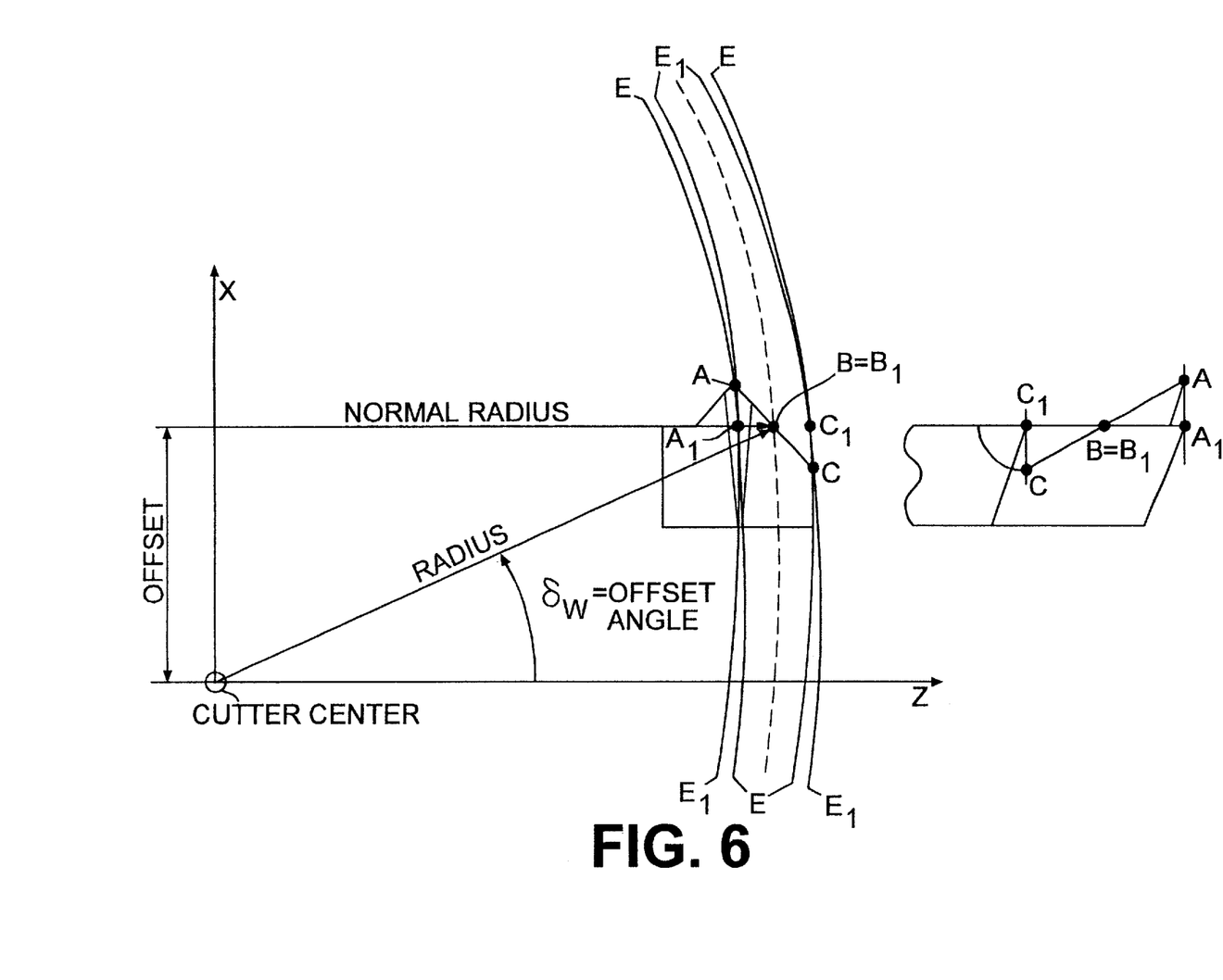
FIG. 6 illustrates the effect of hook angle on the epicycloid path of a cutting tool in face hobbing.

FIG. 6 shows a cutting blade with Points A, B and C along a cutting edge that has a positive hook angle (two-side-ground). FIG. 6 also shows a cutting edge (Points $A_1$, $B_1$ and $C_1$) without any hook angle (three-side-ground). The epicyclical path E generated by A is different than the path $E_1$ generated by $A_1$. The curve associated with $A_1$ has a similar, but not identical, shape than the one generated by A. The two curves are inclined and shifted relative to each other in the Z-direction. That means the spiral angle of curve A decreases relative to $A_1$. The opposite happens for the curves at C and $C_1$. Points B and $B_1$ are coincident. Thus, based on the above discussion, the presence of the hook angle causes a positive flank twist between heel (outside) and toe (inside) ends of the gear tooth.

The present invention provides a cutter and blade system that allows all the freedoms of the three-side-ground cutting blade while using a two-side-ground cutting blade. By finding the radial location of a plurality of points to define the cutting edge of a given two-side-ground cutting blade (the plurality of points lying on the same epicycloid generated by a three-side-cutting cutting blade with different hook and side rake angles), the newly defined cutting edge on the given two-side-ground cutting blade will duplicate the tooth surface cut by the three-side-ground cutting blade with different hook side rake angles. It is assumed that the given blade consists of a permanent front face, no hook angle and a side rake that is constant along the blade shank. The hook angle of the system is created by an inclination of the mounting slot in the cutter head.

As stated above, Points B and $B_1$ are identical (FIG. 6). It is necessary to find the locations of the Points A and C in the Z-direction to have them cut the same epicyclical path as $A_1$ and $C_1$ (along the existing front face of the simplified given cutting blade). The geographic height of the cutting blade, with respect to the cutter head front face, remains constant.

Figure 7:
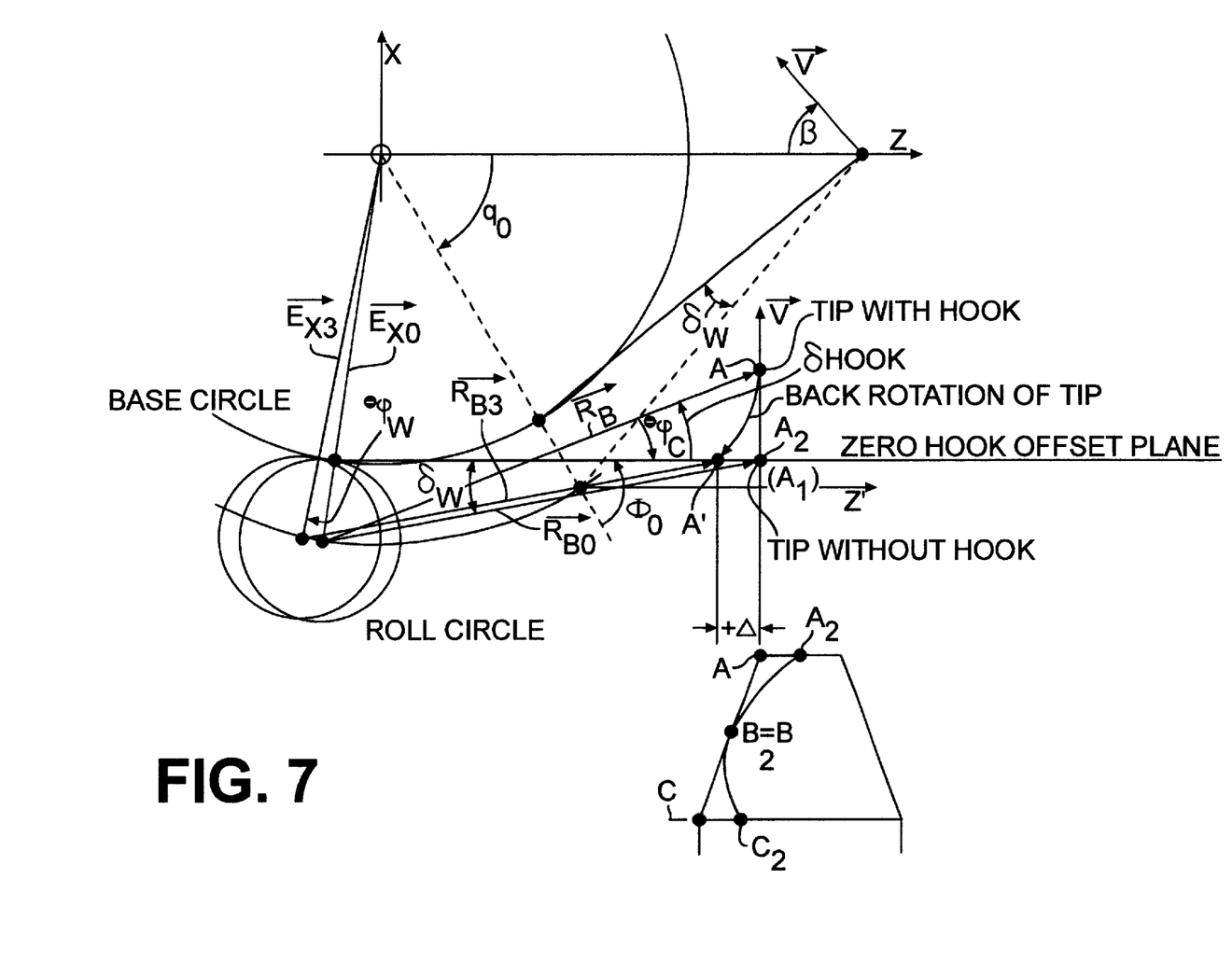
FIG. 7 illustrates the inventive method of determining a new two-side-ground cutting blade profile for duplicating gears cut by three-side-ground cutting blades.
Figure 8:
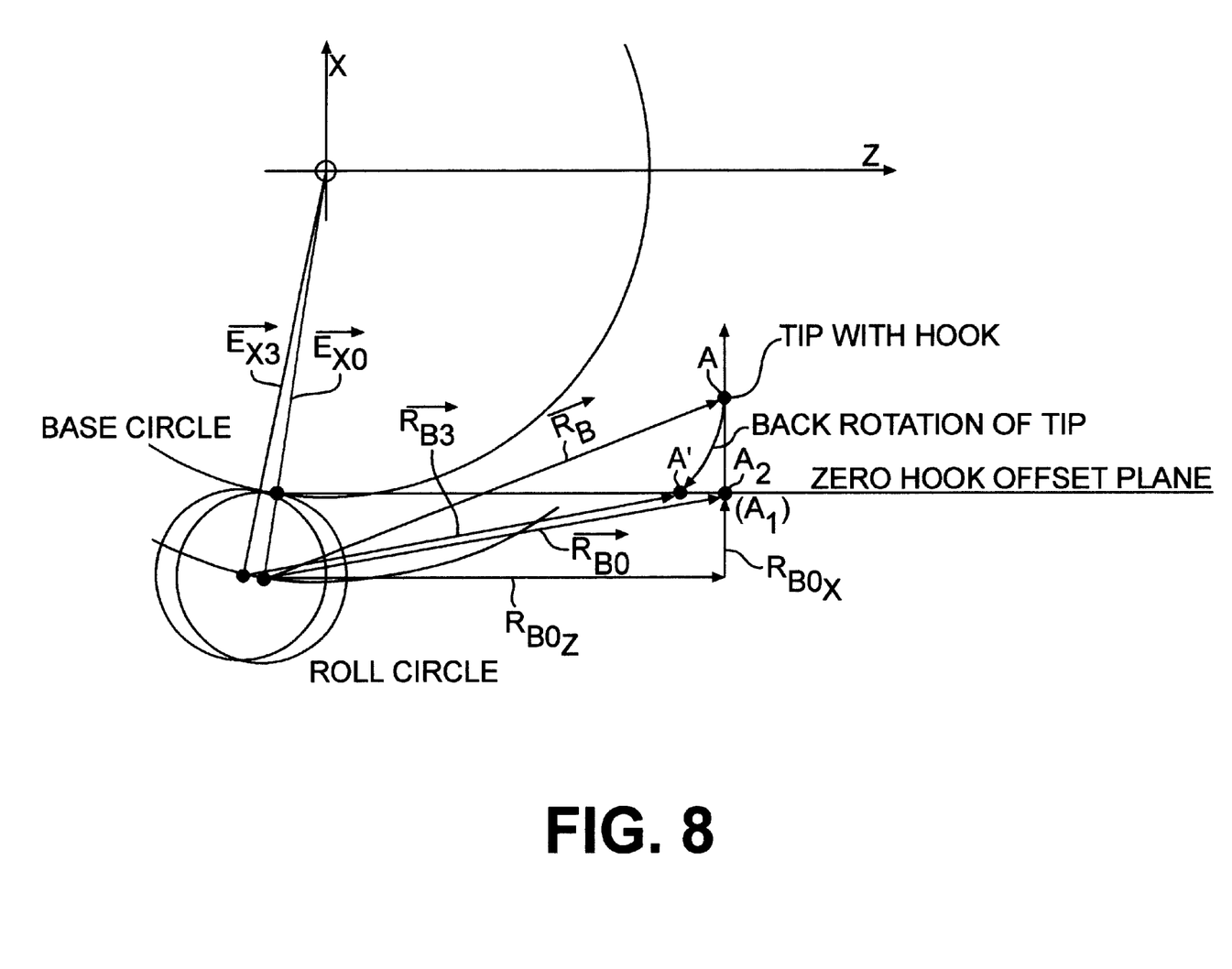
FIG. 8 is a simplified view of FIG. 7 in which the X and Z components of $\vec{R}_{B0}$ are shown.
Figure 9:
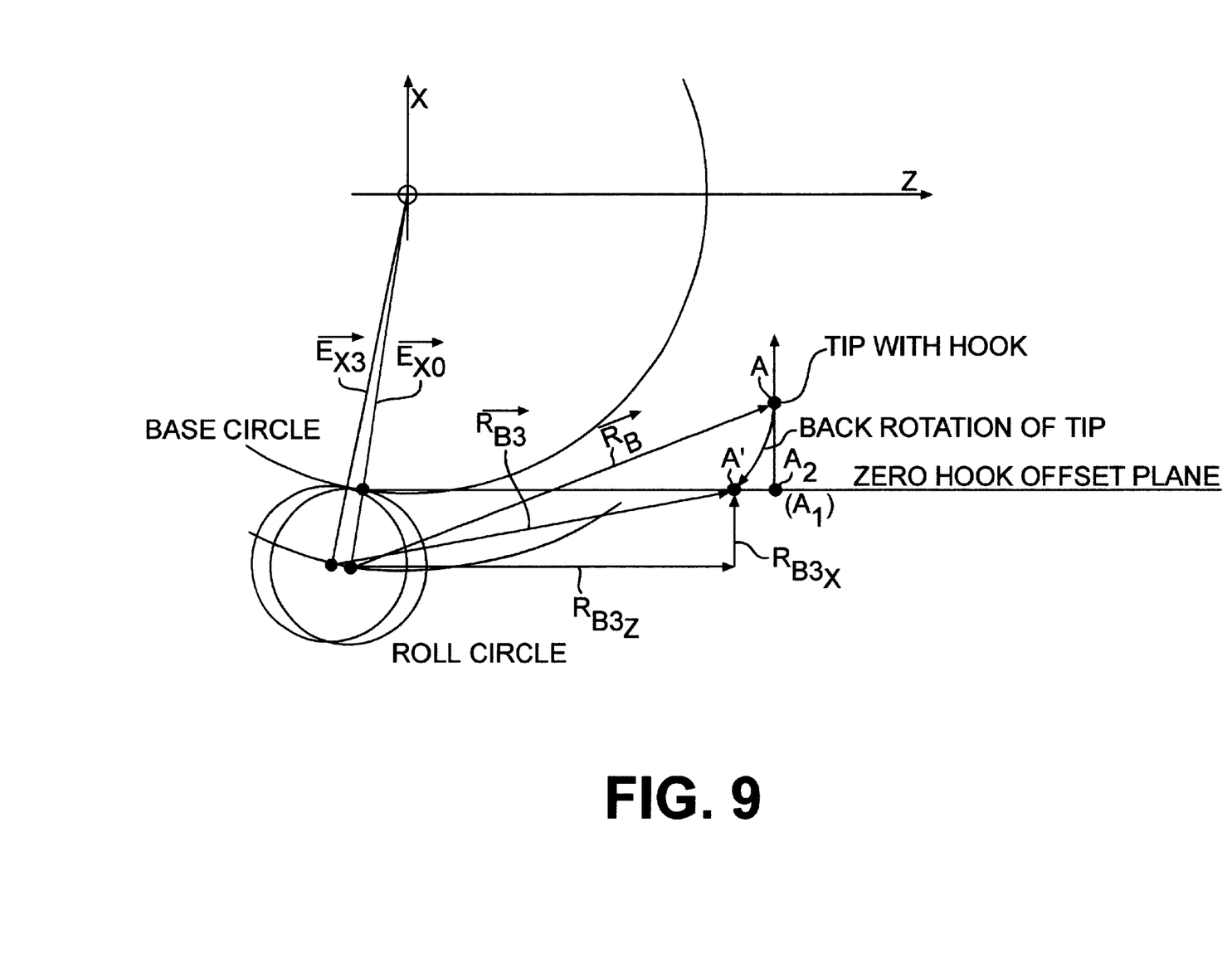
FIG. 9 is a simplified view of FIG. 7 in which the X and Z components of $\vec{R}_{B3}$ are shown.

To find the new location of Point A, the epicyclical kinematic representation of FIG. 7 is referred to wherein roll circle and base circle are rotated clockwise until A contacts the front face of the "new" cutting blade. This is location A'. The movement from A to A' requires rotation around the roll circle center, superimposed by a rotation around the center of the base circle. The relationship for this movement as shown in FIG. 7 may be described by the following:

$$E_{X0x}+R_{B0x}=E_{X3x}+R_{B3x} \quad (1)$$

or $$S*\sin(-\Phi_0+\delta_w)+R_{BO}*\sin(\delta_w)=S*\sin(-\Phi_0+\delta_w+\phi_w)+R_B*\sin(\delta_w+\phi_{Hook}+\phi_C) \quad (2)$$

where:

$R_{B0x}$=x-component (FIG. 8) of cutter radius vector (blade without hook);

$R_{B3x}$=x-component (FIG. 9) of cutter radius vector (blade with hook, rotated into zero hook plane);

$E_{X0x}$=x-component of vector $E_{X0}$ from machine center to cutter center (blade without hook);

$E_{X3x}$=x-component of vector $E_{X3}$ from machine center to cutter

S=radial distance (scalar of $E_{X0x}$);

$\Phi_0$=cutter phase angle;

j=swivel angle;

$\delta_w$=offset angle (face hobbing);

$R_{B0}$=scalar cutter radius (without hook);

$\phi_w$=rotation of cutter center about base circle;

$R_B$=scalar cutter radius (with hook);

$\phi_{Hook}$=angle between $R_B$ and $R_{B0}$;

$\phi_C$=rotation of blade with hook angle around roll circle (cutter center);

$q_0$=roll position of the generating gear;

$\beta$=spiral angle of workpiece; and, $R_{B3}$=scalar cutter radius vector (blade with hook, rotated into zero hook plane).

Between $\phi_w$ and $\phi_c$ is the following relationship:

$$\phi_w=\phi_C/(1+Z_{generating\ gear}/Z_{cutter}) \quad (3)$$

where:

$Z_{generating\ gear}$=number of teeth in generating gear, and $Z_{cutter}$=number of starts on cutter.

Equation (2) is solved for $\phi_W$. The mathematical solution is conducted with an iteration algorithm, for example (for maximum of 100 iterations):

$\phi_W$=start value $$\varphi_C = \varphi_W * \left(1 + \frac{Z_{generating\ gear}}{Z_{cutter}}\right)$$

$$\varphi_W = \arcsin\left[\sin(-\Phi_0+\delta_W) + \frac{R_{BO}*\sin\delta_W}{S} - \frac{R_B*\sin(\delta_W+\varphi_{HOOK}+\varphi_C)}{S}\right] + \Phi_0 - \delta_W$$

Do I=1, 100

$\phi$old=$\phi$w

IF ($\phi_{Old}$-$\phi_W$<limit) GO TO STOP

END DO

The difference between A' and $A_2$ (FIG. 7) is defined as:

$$\Delta=|R_{B3}-R_{B0}| \quad (4)$$

$\Delta$ is the displacement of the normal radius (along Z-axis) of Point A' to Point $A_1$ (which results in Point $A_2$), that cuts the same epicycloid as Point $A_1$ where $A_1$ has, in the coordinate system of FIG. 7, the same location as Point $A_2$. The disclosed method is precise in an infinitesimal observation with respect to the actual epicycloid cut by $A_1$. Given the magnitude of any differences, the inventive method represents a mathematical precise solution that, in practice, causes differences over the entire tooth flank surface of up to only a few microns which, therefore, can be neglected.

The analog scheme can be applied to find Point $C_2$ (FIG. 7) that cuts the same epicycloid as Point $C_1$ (FIG. 5), a rotation of the epicyclical kinematic base and roll circles in the counter clockwise direction brings Point C to the front face of the new cutting blade. In FIG. 7, the new cutting edge profile $A_2$, $B_2$, $C_2$ is shown compared to the given cutting edge A, B, C initially present on the two-side-ground cutting blade. The new cutting edge profile $A_2$, $B_2$, $C_2$ will cut the same epicycloid-shaped tooth surface as the three-side-ground cutting blade having the $A_1$, $B_1$, $C_1$ cutting edge profile.

According to the above method, any desired number of points along the cutting edge of one particular hook angle can be converted into a point on a cutting edge without a hook angle or a cutting edge with another chosen hook angle.

Depending on the mathematical function-defined shape of the new cutting edge (e.g. circle, ellipse or higher order), three, four, five or more points can be transformed from the original cutting edge to the new cutting edge. Three points, one on the tip, one in the center and one on the end of the cutting edge, deliver a sufficient definition of the cutting edge function to capture the characteristics of the different front face hook angles.

The present invention may also lend itself to influencing the blade spacing in the cutter head by grinding the front face of either the inside or outside cutting blade further back resulting in a tooth thickness or slot width change. A tooth thickness adjustment is accomplished by splitting the required amount and, for example, increasing the radius of the outer cutting blade cutting edge and decreasing the cutting edge radius of the inner cutting blade each by half of the required amount.

With the present invention, a side relief and front face sharpened (three-side-ground) cutting blade may be converted into a cutting blade having a permanent front face and is just profile shaped or re-sharpened on the side relief surfaces (two-side-ground). All three-side-ground jobs (gear sets cut by three-side-ground cutting blades) can be converted into jobs cut by the inventive two-side-ground cutting blades having a permanent front face coating. Gear sets do not have to be re-qualified after the conversion since the tooth flank surface geometry stays identical to the original tooth surface geometry cut by the original three-side-ground cutting blades.

It is to be understood that the initial cutting edge A, B, C of the two-side-ground cutting blade may be an actual cutting edge to be modified in accordance to the present inventive method, or, initial cutting edge A, B, C may be a theoretically cutting edge from which position the new cutting edge, $A_2$, $B_2$, $C_2$ for example, is calculated (such as when the new cutting edge is formed by cutting and/or grinding from a cutting blade blank). The skilled artisan will appreciate that there may arise instances where repositioning of points may result in material being added on to the initial reference cutting edge instead of removed therefrom.

In the instance where the three-side-ground cutting blade possesses a hook angle, the identified points along the cutting edge will e in different planes as compared to all identified points being in the same plane when the hook angle equals zero. In this instance, the respective planes comprising each point along the cutting edge are identified and each corresponding point from the initial cutting edge of the two-side-ground cutting is repositioned (back rotated as shown in FIG. 7) into the appropriate plane and the radius displacement ($\Delta$) is then calculated. For points that are coincident (Points B and $B_1$ in FIG. 6 for example), no repositioning or radial displacement is necessary.

The advantage of replacing the three-side-ground cutting blades is in particular the permanent character of the front face and its coating which is possible in the new two-side-ground cutting blade. Cutting processes utilizing carbide high-speed cutting tools depends to a large extent on the correct front face coating. All gear sets designed with a system using three-side-ground cutting blades can hardly be converted to a manufacturing method using high-speed carbide cutting. To send a set of three-side-ground cutting blades to a coating facility after each re-sharpening, requires an inventory of more expensive carbide cutting blades and includes the cost of up to one hundred re-coatings for each cutting blade. The re-coating procedure alone may increase tooling costs by as much as a factor of eight.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of producing a cutting edge on a two-side-ground cutting blade for cutting an epicycloid-shaped tooth surface which is a duplicate of an epicycloid-shaped tooth surface cut by a three-side-ground cutting blade, said two-side-ground cutting blade having a cutting edge, hook angle and a side rake angle and said three-side-ground cutting blade having a cutting edge, hook angle and a side rake angle with said hook angle and said side rake angle of said three-side-ground cutting blade being different than those of said two-side-ground cutting blade, the method comprising:

defining a reference cutting edge on said two-side-ground cutting blade, defining a cutting edge on a three-side-ground cutting blade, identifying a plurality of points on said reference cutting edge and corresponding points on said cutting edge of said three-side-ground cutting blade, identifying a respective zero hook plane for each of said points on the cutting edge of said three-side-ground cutting blade, repositioning each point on said reference cutting edge into the respective zero hook plane for the corresponding point on the cutting edge of said three-side-ground cutting blade, determining the distance between the repositioned points and the respective corresponding points of the three-side-ground cutting blade, adjusting the position of each point on said reference cutting edge by the respective determined distances, removing material from or adding material to the two-side-cutting blade in accordance with the positions of the adjusted points whereby a new cutting edge is formed on the two-side-ground cutting blade which cuts an epicycloid-shaped tooth surface which is a duplicate of that cut by the three-side-ground cutting blade.

2. The method of claim 1 wherein the hook angle of the three-side-ground cutting blade is zero and wherein all corresponding points on the cutting edge of the three-side-ground cutting blade lie in a single zero hook plane.

3. The method of claim 1 wherein the three-side-ground cutting blade comprises a non-zero hook angle and wherein the corresponding points on the cutting edge of the three-side-ground cutting blade lie in respective zero hook planes that are not all identical.

4. The method of claim 3 wherein corresponding points from said reference cutting edge are repositioned into the zero hook plane of the respective points on the cutting edge of the three-side-ground cutting blade.

5. The method of claim 1 wherein at least two of said corresponding points are identical.

* * * * *